McLaughlin & Hill,
2
Dressing Leather.
Patented Apr. 28, 1836.
X 9628
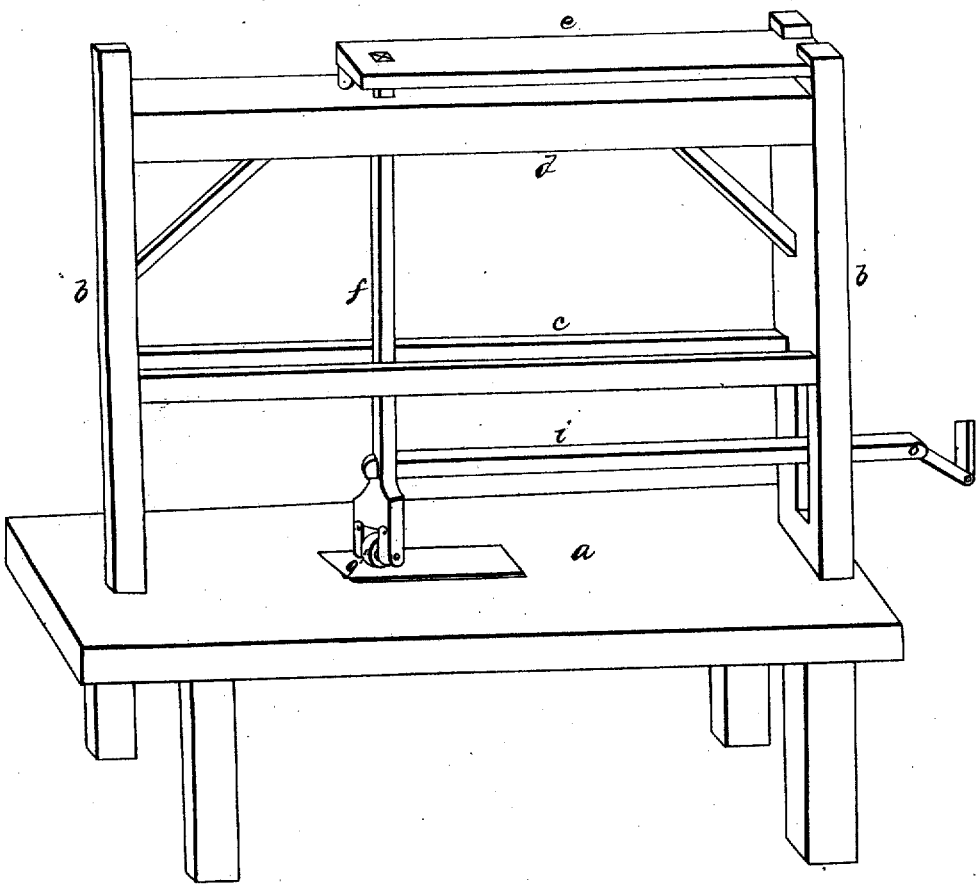

Ira M^c Laughlin & Hiram Hill
Letters Patent

The schedule referred to in these Letters Patent and making [illegible] of the same containing a description in the words of the said Ira M^c Laughlin & Hiram Hill themselves of their improvement in the Machine for Rolling Leather.

To all persons to whom these presents shall come. Be it known that we Ira M^c Laughlin & Hiram Hill both of Sunderland, County of Bennington and state of Vermont have jointly invented a new and useful improvement in the common pendilum rolling machine, used for rolling leather which improvement or invention we specify and describe in manner following viz. To show the nature properties and extent of our improvement we here describe a machine for a size suitable for rolling leather. The drawing exhibits a perspective view of the machine here described and references are made to the same in the description. In the construction of the machine some kind of hard wood should be used. The table or platform (a) is sixteen feet long four feet wide and four inches thick raised three feet from the floor and resting on firm supports. To this table is firmly framed two upright or perpendicular posts (b,b,) eight feet in length, four inches wide and eight inches thick resting one foot from the front, and six inches from the ends of the table. To each side of these posts and two feet six inches distance from the table or base are fitted or framed two cross pieces or girts (c) fifteen feet long six inches wide and two inches thick. Also to the posts six feet and six inches from the table is framed a beam (d) sixteen feet long and one foot square. To the post standing on the right end of the table and three inches below the top of the same is attached by a moovable joint a weight beam (e) nine feet long one foot wide and [illegible] inches thick on this beam is placed the weight necessary for the operation

[illegible]ation of rolling the leather. To the weight beem and eight feet from the moveable joint by which it is attached to the posts is connected by a moveable joint a pendilum (f) passing through a wide mortice in the main beam and between the two girts, eight feet long, four inches thick and one foot wide at the lower end. To the lower or wide end of the pendilum is fitted a brass roller (g) six inches long and four inches diameter with an iron gudgeon one foot long passing through the centre of the roller. Directly under the end of the weight beam, is framed or fitted into the upper side of the main beem a block (h) or rest of sufficient heighth for the weight beem to rest upon after the pendilum has swung fifteen inches past the centre of Motion. To the pendilum and one foot and six inches above the roller is connected by a moveable joint a sweep (i) passing through a wide mortice in the right post the end of which is to be attached to a crank, to which the power is applied that moves the machine. What we claim as our invention or improvement is that part of the construction of the machine, which raises the roller from the leather after it has passed a certain distance either way past the centre of Motion, by means of which the leather can be moved and placed under the roller, without the trouble or inconvenience of moveing or displacing the weights or power as in the common way. But we do not claim as any part of our invention the whole or any of the parts of the above described machine formerly in use or the perticular size or shape of the same any further than is necessary to effect the self raising of the roller from the leather during the operation of rolling.

Witnesses

James A. Graves
Benjn. S. Hill

Ira McLaughlin
Hiram Hill

Drawing

[720 words]